US012580628B2

(12) United States Patent
Arnold et al.

(10) Patent No.: US 12,580,628 B2
(45) Date of Patent: Mar. 17, 2026

(54) MULTI-MODAL BEAM PREDICTION

(71) Applicant: QUALCOMM Incorporated, San Diego, CA (US)

(72) Inventors: Maximilian Wolfgang Martin Arnold, Amsterdam (NL); Bence Major, Amsterdam (NL); Arash Behboodi, Amsterdam (NL); Hanno Ackermann, Amsterdam (NL); Fabio Valerio Massoli, Amsterdam (NL); Joseph Binamira Soriaga, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/505,966

(22) Filed: Nov. 9, 2023

(65) Prior Publication Data

US 2025/0158688 A1 May 15, 2025

(51) Int. Cl.
H04B 7/06 (2006.01)
(52) U.S. Cl.
CPC ....... H04B 7/06952 (2023.05); H04B 7/0626 (2013.01)
(58) Field of Classification Search
CPC .......................... H04B 7/06952; H04B 7/0626; H04B 7/0695; G06N 20/20; G06N 3/045; G06N 3/044
See application file for complete search history.

(56) References Cited

U.S. PATENT DOCUMENTS

| | | | | |
|---|---|---|---|---|
| 2022/0014946 A1* | 1/2022 | Merwaday | ............ | H04W 24/04 |
| 2022/0392583 A1* | 12/2022 | Godin | .................... | G16C 20/50 |
| 2024/0338602 A1* | 10/2024 | Harvey | .................. | G06N 20/00 |

FOREIGN PATENT DOCUMENTS

WO    2023091164 A1    5/2023

OTHER PUBLICATIONS

Deepsense 6G: "Vision-Aided Blockage Prediction", Wireless Intelligence Lab ASU, Jan. 15, 2021, 8 Pages.
Jiang S., et al., "Digital Twin Based Beam Prediction: Can we Train in the Digital World and Deploy in Reality?", arXiv:2301.07682v1 [eess.SP], Jan. 18, 2023, 6 Pages.
Shirani F., "DeepVerse 6G Machine Learning Challenge—Registration Deadline: May 20th", IEEE Information Theory Society, Apr. 21, 2023, 2 Pages.
(Continued)

*Primary Examiner* — John J Lee
(74) *Attorney, Agent, or Firm* — Seyfarth Shaw LLP

(57) ABSTRACT

A processor-implemented method for multimodal beam management implemented by a network device includes receiving, by the network device, a stream of inputs from one or more sensors. The network device generates a digital twin modeling an environment of a region observed by the one or more sensors. The digital twin includes one or more objects detected based on the stream of inputs. The network device manages a wireless communication signal beam for communicating with at least one user equipment (UE) in the region observed by the one or more sensors based at least in part on the digital twin.

17 Claims, 16 Drawing Sheets

1400 ⟶

1402 ⟶ RECEIVE, BY THE NETWORK DEVICE, A STREAM OF INPUTS FROM ONE OR MORE SENSORS

1404 ⟶ GENERATE, BY THE NETWORK DEVICE, A DIGITAL TWIN MODELING AN ENVIRONMENT OF A REGION OBSERVED BY THE ONE OR MORE SENSORS, THE DIGITAL TWIN INCLUDING ONE OR MORE OBJECTS DETECTED BASED ON THE STREAM OF INPUTS

1406 ⟶ MANAGE, BY THE NETWORK DEVICE, A WIRELESS COMMUNICATION SIGNAL BEAM FOR COMMUNICATING WITH AT LEAST ONE USER EQUIPMENT (UE) IN THE REGION OBSERVED BY THE ONE OR MORE SENSORS BASED AT LEAST IN PART ON THE DIGITAL TWIN

(56) References Cited

OTHER PUBLICATIONS

Zhang Y., et al., "A Digital Twin Assisted Framework for Interference Nulling in Millimeter Wave MIMO Systems", arXiv:2301.13311v1 [cs.IT], Jan. 30, 2023, 6 Pages.

Alkhateeb A., et al., "Real-Time Digital Twins: Vision and Research Directions for 6G and Beyond", IEEE Communications Magazine, vol. 61, No. 11, Nov. 1, 2023, pp. 128-134, XP093129542, US, the whole document.

International Search Report and Written Opinion—PCT/US2024/045050—ISA/EPO—Dec. 5, 2024.

* cited by examiner

400

502

FULLY CONNECTED

504

LOCALLY CONNECTED

510

512

514

516

506

CONVOLUTIONAL

508

650

700

702 Camera

704 Process The Inputs no or limited amount of intervention

706 Digital Twin

708 Communication improvement
- handover prediction
- reflected beam selection

...

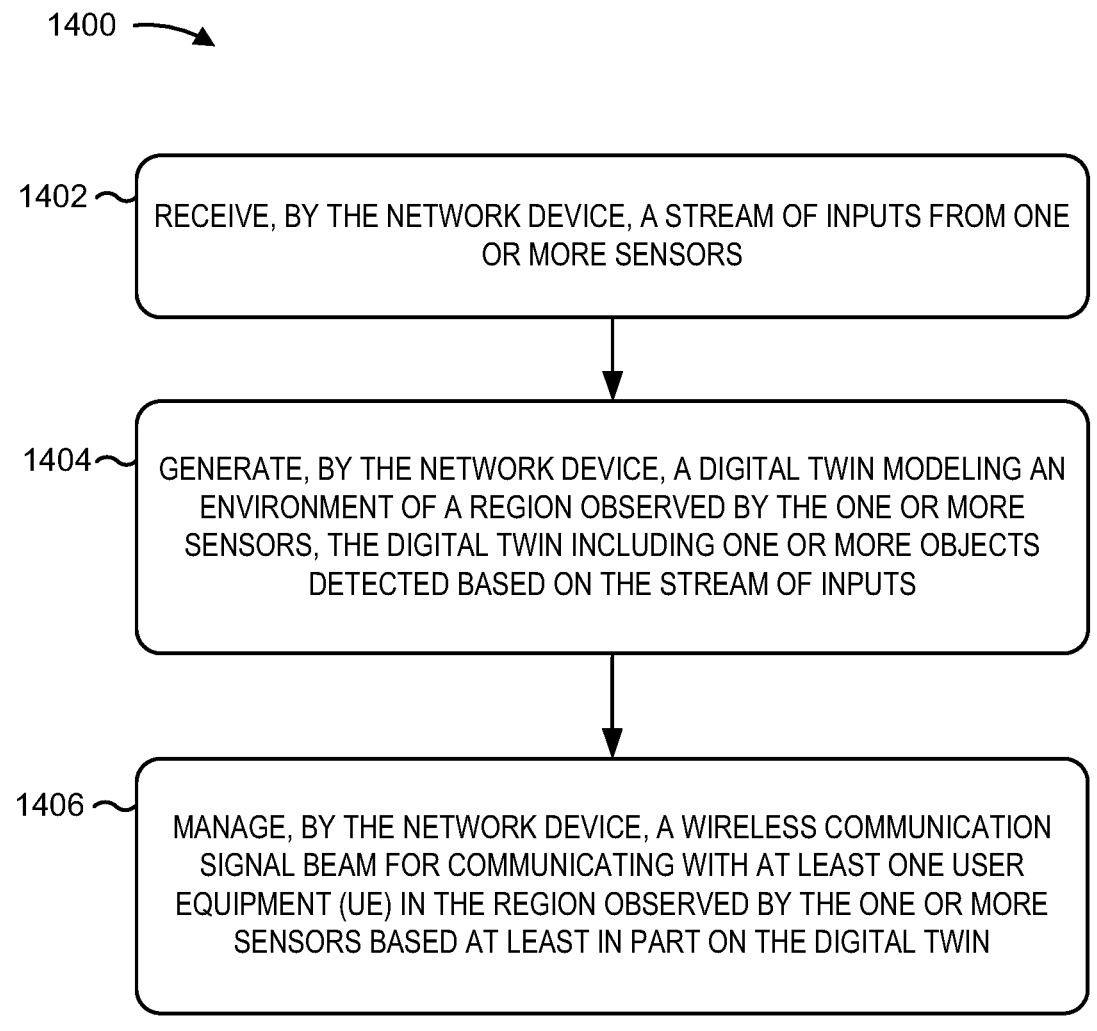

1400

1402 — RECEIVE, BY THE NETWORK DEVICE, A STREAM OF INPUTS FROM ONE OR MORE SENSORS

1404 — GENERATE, BY THE NETWORK DEVICE, A DIGITAL TWIN MODELING AN ENVIRONMENT OF A REGION OBSERVED BY THE ONE OR MORE SENSORS, THE DIGITAL TWIN INCLUDING ONE OR MORE OBJECTS DETECTED BASED ON THE STREAM OF INPUTS

1406 — MANAGE, BY THE NETWORK DEVICE, A WIRELESS COMMUNICATION SIGNAL BEAM FOR COMMUNICATING WITH AT LEAST ONE USER EQUIPMENT (UE) IN THE REGION OBSERVED BY THE ONE OR MORE SENSORS BASED AT LEAST IN PART ON THE DIGITAL TWIN

INITIATE, BY THE UE, WIRELESS COMMUNICATION WITH A NETWORK DEVICE

RECEIVE, BY THE UE, A WIRELESS COMMUNICATION SIGNAL BEAM FROM THE NETWORK DEVICE, THE WIRELESS COMMUNICATION SIGNAL BEAM BEING MANAGED BASED ON A DIGITAL TWIN AND A STREAM OF INPUTS FROM ONE OR MORE SENSORS

MULTI-MODAL BEAM PREDICTION

FIELD OF THE DISCLOSURE

The present disclosure relates generally to wireless communications, and more specifically to signal beam management using machine learning models.

BACKGROUND

Wireless communication systems are widely deployed to provide various telecommunications services such as telephony, video, data, messaging, and broadcasts. Typical wireless communication systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunication system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

The present disclosure is set forth in the independent claims, respectively. Some aspects of the disclosure are described in the dependent claims.

In some aspects of the present disclosure, a processor-implemented method includes receiving, by a network device, a stream of inputs from one or more sensors. The processor-implemented method also includes generating, by the network device, a digital twin modeling an environment of a region observed by the one or more sensors. The digital twin includes one or more objects detected based on the stream of inputs. The processor-implemented method further includes managing, by the network device, a wireless communication signal beam for communicating with at least one user equipment (UE) in the region observed by the one or more sensors based at least in part on the digital twin.

Various aspects of the present disclosure are directed to an apparatus having at least one memory and one or more processors coupled to the at least one memory. The processor(s) is configured to receive, by a network device, a stream of inputs from one or more sensors. The processor(s) is also configured to generate, by the network device, a digital twin modeling an environment of a region observed by the one or more sensors. The digital twin includes one or more objects detected based on the stream of inputs. The processor(s) is further configured to manage, by the network device, a wireless communication signal beam for communicating with at least one user equipment (UE) in the region observed by the one or more sensors based at least in part on the digital twin.

In some aspects of the present disclosure, a processor-implemented method performed by at least one processor includes initiating, by a UE, wireless communication with a network device. The method still further includes receiving, by the UE, a wireless communication signal beam from the network device. The wireless communication signal beam is managed based on a digital twin and a stream of inputs from one or more sensors observing the UE and one or more objects in an environment modeled in the digital twin.

Various aspects of the present disclosure are directed to an apparatus having at least one memory and one or more processors coupled to the at least one memory. The processor(s) is configured to initiate, by a UE, wireless communication with a network device. The processor(s) is configured to receive, by the UE, a wireless communication signal beam from the network device. The wireless communication signal beam is managed based on a digital twin and a stream of inputs from one or more sensors observing the UE and one or more objects in an environment modeled in the digital twin.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 14 is a flow diagram illustrating an example process for beam management using a digital twin and a stream of inputs from a sensor by a network device, in accordance with various aspects of the present disclosure.

DETAILED DESCRIPTION

Figure 1:
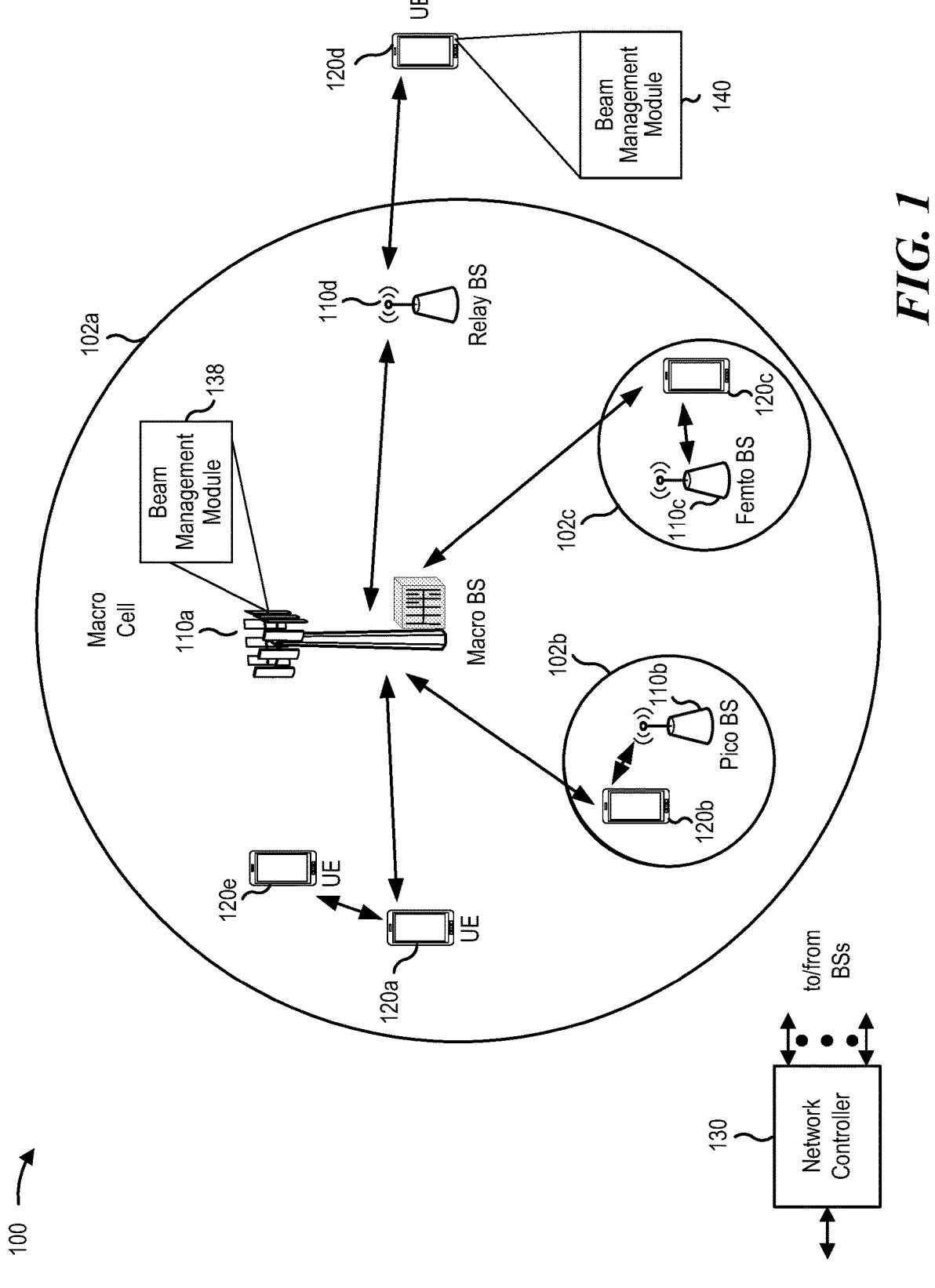
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G, 6G, and later wireless technologies, aspects of the present disclosure can be applied in other generation-based communication systems, such as and including 3G and/or 4G technologies.

Sixth generation (6G) wireless communication systems may include support for applications such as augmented reality, multisensory communications, and high-fidelity holograms (e.g., via cameras, light detection and ranging (LiDAR) sensors, and inertial measurement unit (IMU) sensors). Such applications may also aid in solving communication problems and help to make communication more efficient.

As the demand for service continues to grow and the number of devices supported increases, it may be challenging to maintain high performance. Such challenges may include adapting to different characteristics encountered with different data modalities. Furthermore, the fusion of different data modalities involves carefully designing the feature extractions as well as the fusion processes.

Accordingly, aspects of the present disclosure may employ machine learning (ML) and, more generally, artificial intelligence (AI), to leverage multi-modal data and context awareness. In various aspects, cameras may gather or infer information from an environment for use in a specific downstream task (e.g., blockage estimation for communication) or to aid a downstream ML system.

Particular aspects of the subject matter described in this disclosure can be implemented to realize one or more of the following potential advantages. In some examples, the described techniques, such as beam management based on a digital twin and a stream of input from one or more sensors may enable more reliable communication in congested areas or during inclement weather.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), a network node, a network entity, and/or the like. A BS can be implemented as an aggregated base station, as a disaggregated base station, an integrated access and backhaul (IAB) node, a relay node, a sidelink node, etc. The BS can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) proto-col, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

The UEs 120 may include a beam management module 140. For brevity, only one UE 120d is shown as including the beam management module 140. The beam management module 140 may determine a beam update for wireless communication with a network device. For example, using the beam management module 140, the UE (e.g., 120) may initiate wireless communication with a network device (e.g., 110/130). The UE (e.g., 120) may receive a wireless com-munication signal beam from the network device. The wireless communication signal beam may be managed based on a digital twin and a stream of inputs from one or more sensors observing the UE (e.g., 120) and one or more objects in an environment modeled in the digital twin.

Figure 3:
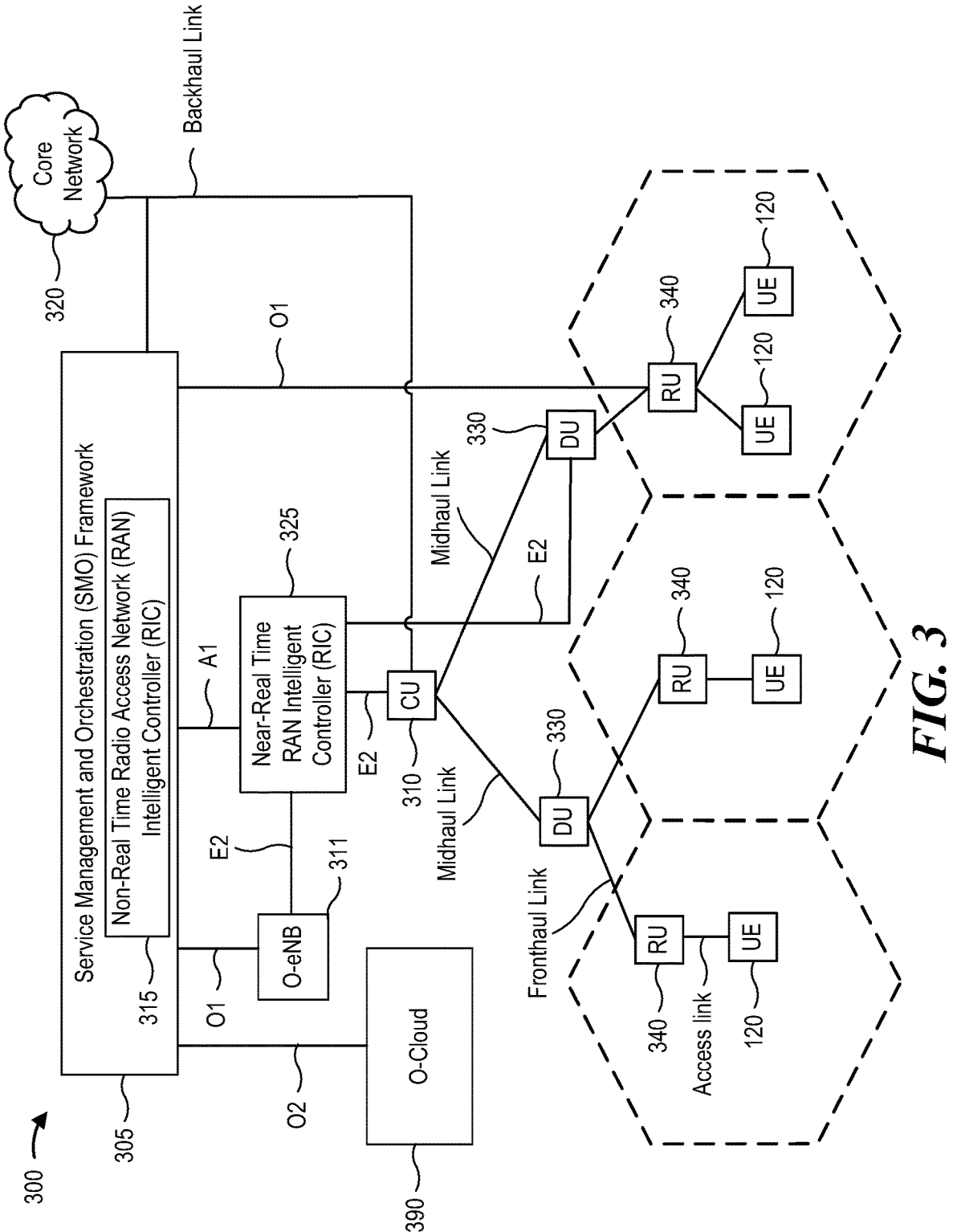
FIG. 3 is a block diagram illustrating an example disaggregated base station architecture, in accordance with various aspects of the present disclosure.

The network controller 130 or the base stations 110 or any other network device (e.g., as seen in FIG. 3) may include a beam management module 138 for managing a wireless communication signal beam for communicating with one or more UEs 120. For instance, using beam management module 138, the network device (e.g., 110/130) may receive a stream of inputs from one or more sensors. The network device (e.g., 110/130) may generate a digital twin modeling an environment of a region observed by the one or more sensors. The digital twin includes one or more objects detected based on the stream of inputs. The network device (e.g., 110/130) may manage a wireless communication sig-nal beam for communicating with at least one UE (e.g., 120) in the region observed by the one or more sensors based at least in part on the digital twin.

As indicated above, FIG. 1 is provided merely as an example. Other examples may differ from what is described with regard to FIG. 1.

Figure 2:
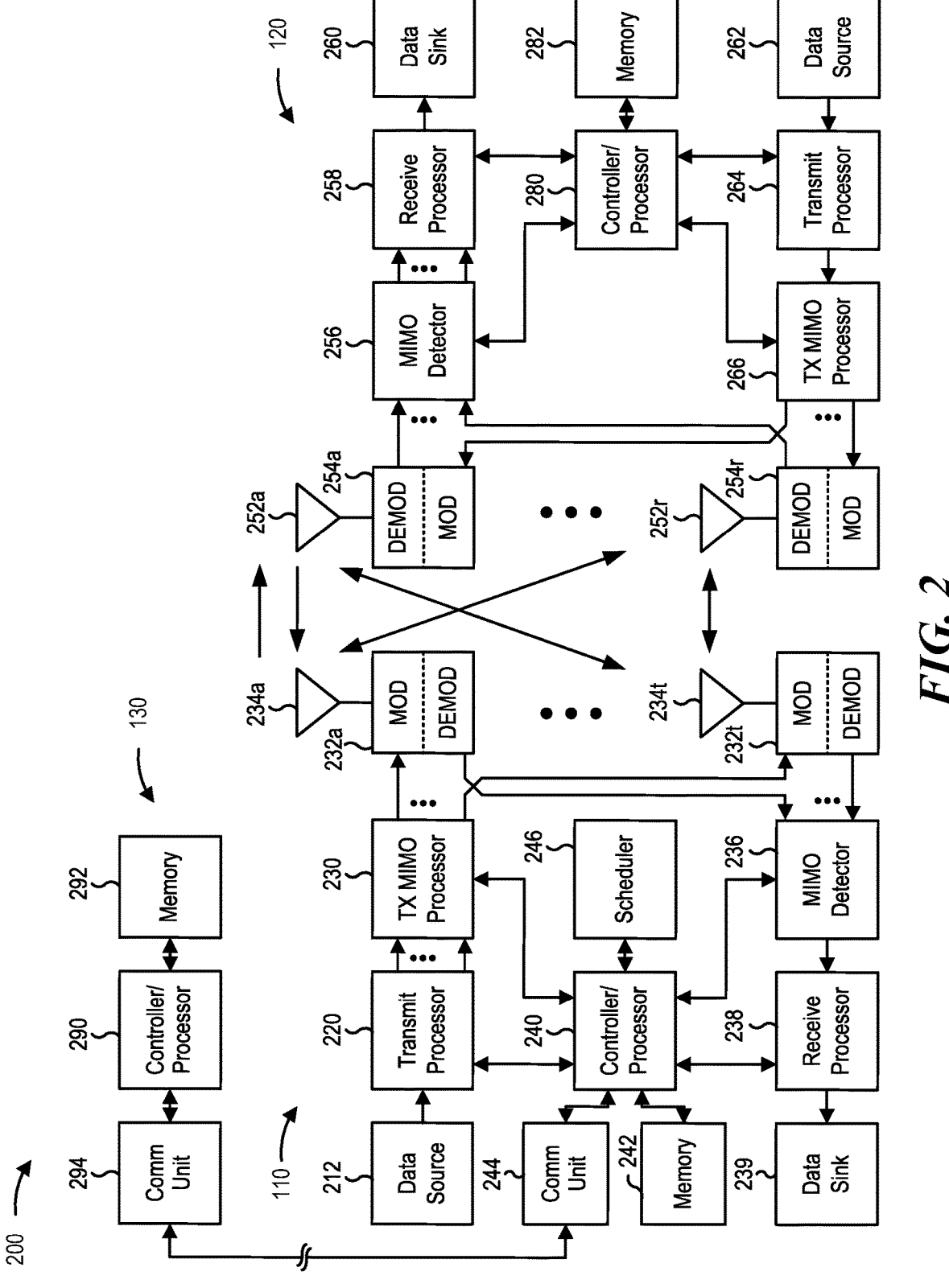
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchro-nization signals (e.g., the primary synchronization signal (PSS) and secondary synchronization signal (SSS)). A trans-mit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency divi-sion multiplexing (OFDM) and/or the like) to obtain an output sample stream. Each modulator 232 may further process (e.g., convert to analog, amplify, filter, and upcon-vert) the output sample stream to obtain a downlink signal. T downlink signals from modulators 232a through 232t may be transmitted via T antennas 234a through 234t, respec-tively. According to various aspects described in more detail below, the synchronization signals can be generated with location encoding to convey additional information.

At the UE 120, antennas 252a through 252r may receive the downlink signals from the base station 110 and/or other base stations and may provide received signals to demodu-lators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive proces-sor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more com-ponents of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further pro-cessed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with determining membership for zone-based federated learning as described in more detail elsewhere. For example, the controller/processor 240 of the base station 110, the controller/processor 280 of the UE 120, and/or any other component(s) of FIG. 2 may perform or direct operations of, for example, the processes of FIGS. 9-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for generating, means for managing, and means for initiating. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more Dus may be co-located with the CU, or alternatively, may be geographically or virtually distributed throughout one or multiple other RAN nodes. The Dus may be implemented to communicate with one or more Rus.

Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (Dus) 330 via respective midhaul links, such as an F1 interface. The Dus 330 may communicate with one or more radio units (Rus) 340 via respective fronthaul links. The Rus 340 may communicate with respective UEs 120 via one or more radio frequency (RF) access links. In some implementations, the UE 120 may be simultaneously served by multiple Rus 340.

Each of the units (e.g., the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more Rus 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) X11, via an O1 interface. Additionally, in some implementations, the SMO Framework 305 can communicate directly with one or more Rus 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
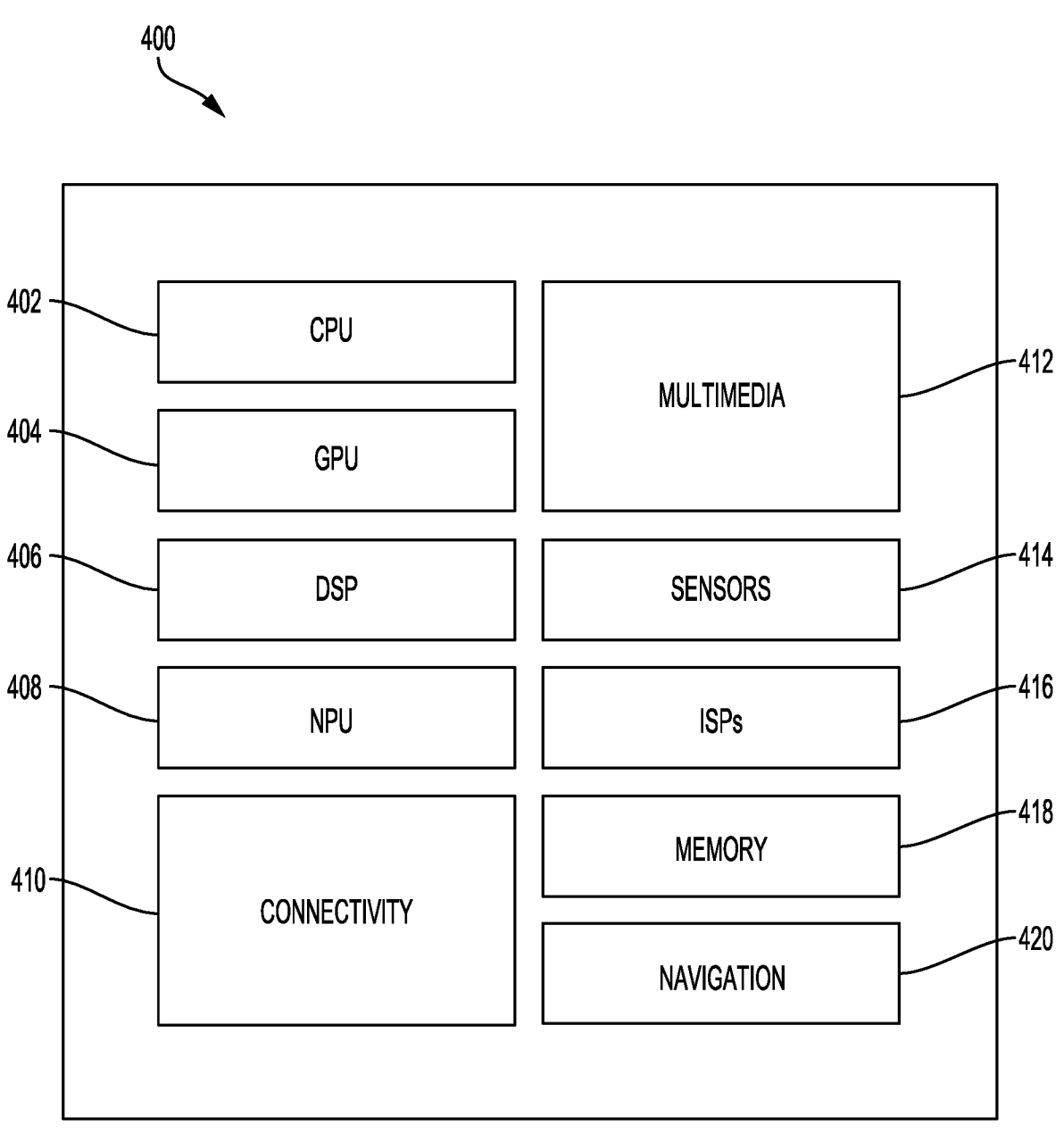
FIG. 4 illustrates an example implementation of designing a neural network using a system-on-a-chip (SOC), including a general-purpose processor, in accordance with certain aspects of the present disclosure.

FIG. 4 illustrates an example implementation of a system-on-a-chip (SOC) 400, which may include a central processing unit (CPU) 402 or a multi-core CPU configured for generating gradients for neural network training, in accordance with certain aspects of the present disclosure. The SOC 400 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a memory block 418, or may be distributed across multiple blocks. Instructions executed at the CPU 402 may be loaded from a program memory associated with the CPU 402 or may be loaded from a memory block 418.

The SOC 400 may also include additional processing blocks tailored to specific functions, such as a GPU 404, a DSP 406, a connectivity block 410, which may include fifth generation (5G) connectivity, fourth generation long term evolution (4G LTE) connectivity, Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation module 420, which may include a global positioning system.

The SOC 400 may be based on an ARM instruction set. In an aspect of the present disclosure, the instructions loaded into the general-purpose processor 402 may comprise code to receive, by the network device, a stream of inputs from one or more sensors. The instructions loaded into the general-purpose processor 402 may also comprise code to generate, by the network device, a digital twin modeling an environment of a region observed by the one or more sensors. The digital twin includes one or more objects detected based on the stream of inputs. The instructions loaded into the general-purpose processor 402 may further comprise code to managing, by the network device, a wireless communication signal beam for communicating with at least one user equipment (UE) in the region observed by the one or more sensors based at least in part on the digital twin.

In various aspects of the present disclosure, the instructions loaded into the general-purpose processor 402 may comprise code to initiate, by the UE, wireless communication with a network device. The instructions loaded into the general-purpose processor 402 may also comprise code to receive, by the UE, a wireless communication signal beam from the network device. The wireless communication signal beam is managed based on a digital twin and a stream of inputs from one or more sensors observing the UE and one or more objects in an environment modeled in the digital twin.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5A:
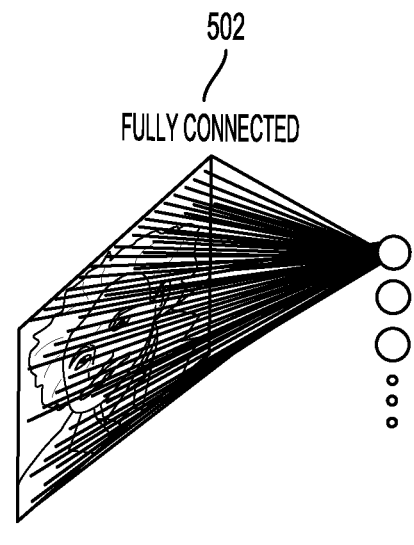
FIGS. 5A, 5B, and 5C are diagrams illustrating a neural network, in accordance with various aspects of the present disclosure.
Figure 5B:
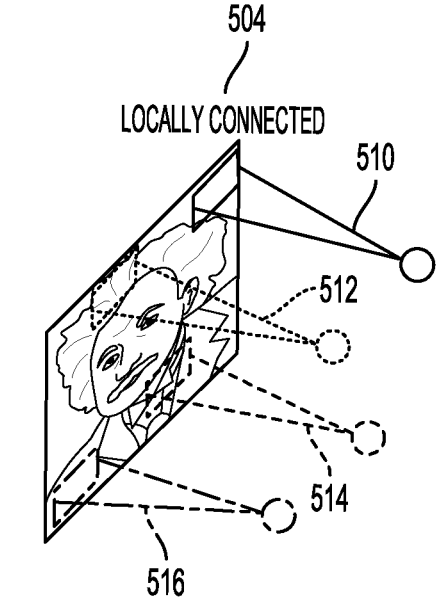

The connections between layers of a neural network may be fully connected or locally connected. FIG. 5A illustrates an example of a fully connected neural network 502. In a fully connected neural network 502, a neuron in a first layer may communicate its output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer because the higher layer neurons in a given region may receive inputs that are tuned through training to the properties of a restricted portion of the total input to the network.

Figure 5C:
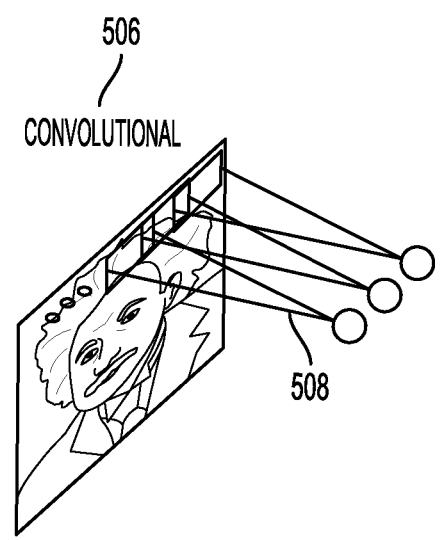

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (e.g., 508). Convolutional neural networks may be well suited to problems in which the spatial location of inputs is meaningful.

Figure 5D:
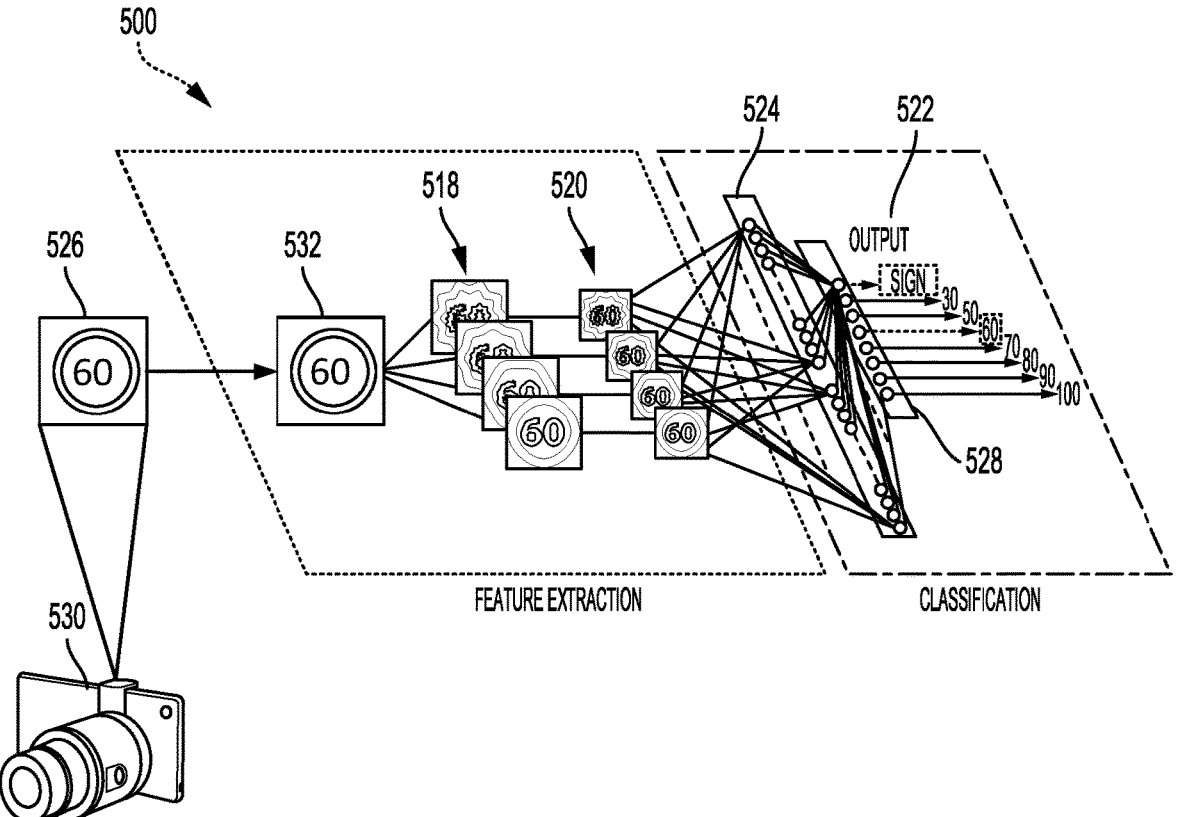
FIG. 5D is a diagram illustrating an exemplary deep convolutional network (DCN), in accordance with various aspects of the present disclosure.

One type of convolutional neural network is a deep convolutional network (DCN). FIG. 5D illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5D, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 may be a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 may likely be incorrect. Thus, an error may be calculated between the output 522 and a target output. The target output is the ground truth of the image 526 (e.g., "sign" and "60"). The weights of the DCN 500 may then be adjusted so the output 522 of the DCN 500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 500 may be presented with new images (e.g., the speed limit sign of the image 526) and a forward pass through the DCN 500 may yield an output 522 that may be considered an inference or a prediction of the DCN 500.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 6:
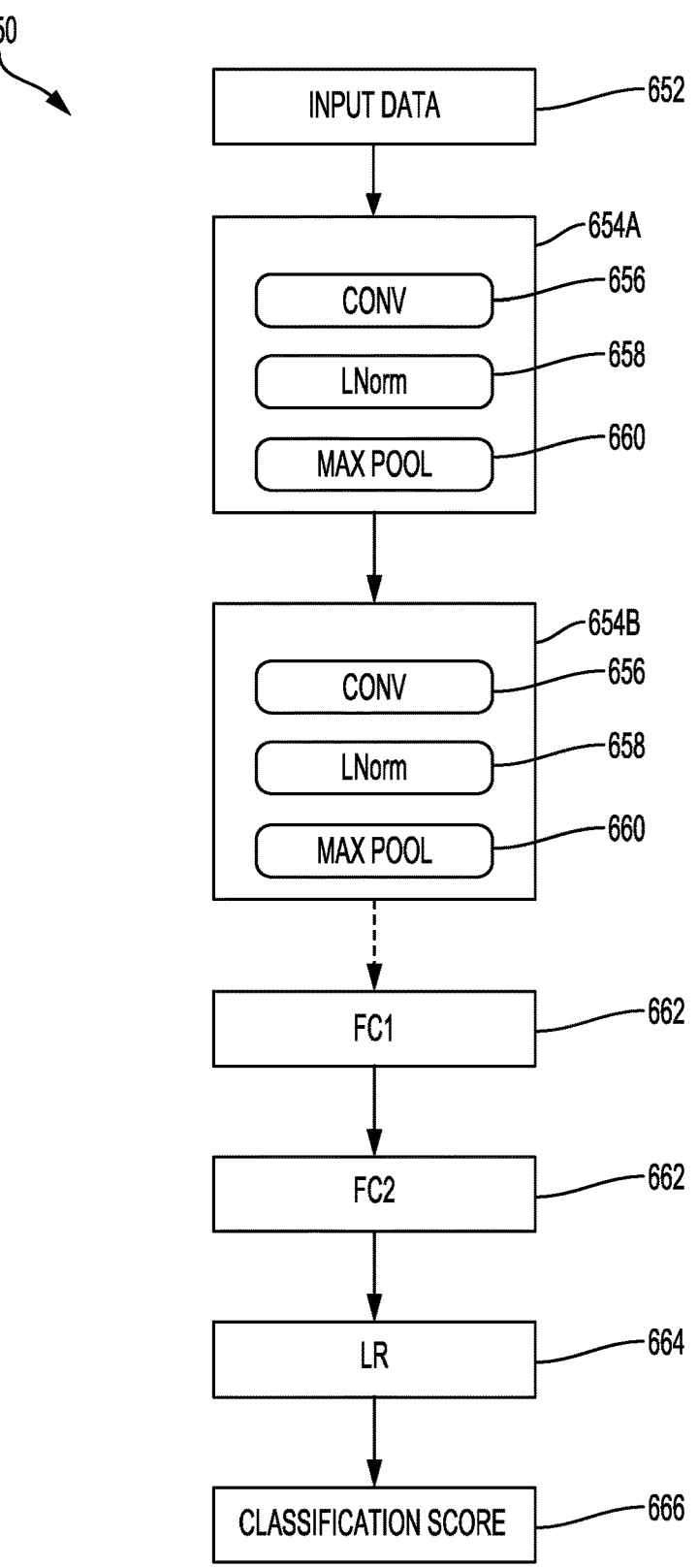
FIG. 6 is a block diagram illustrating an exemplary deep convolutional network (DCN), in accordance with various aspects of the present disclosure.

FIG. 6 is a block diagram illustrating a DCN 650. The DCN 650 may include multiple different types of layers based on connectivity and weight sharing. As shown in FIG. 6, the DCN 650 includes the convolution blocks 654A, 654B. Each of the convolution blocks 654A, 654B may be configured with a convolution layer (CONV) 656, a normalization layer (Lnorm) 658, and a max pooling layer (MAX POOL) 660. Although only two of the convolution blocks 654A, 654B are shown, the present disclosure is not so limiting, and instead, any number of the convolution blocks 654A, 654B may be included in the DCN 650 according to design preference.

The convolution layers 656 may include one or more convolutional filters, which may be applied to the input data to generate a feature map. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a DCN may be loaded on a CPU 402 or GPU 404 of an SOC 400 (e.g., FIG. 4) to achieve high performance and low power consumption. In alternative embodiments, the parallel filter banks may be loaded on the DSP 406 or an ISP 416 of an SOC 400. In addition, the DCN 650 may access other processing blocks that may be present on the SOC 400, such as sensor processor 414 and navigation module 420, dedicated, respectively, to sensors and navigation.

The DCN 650 may also include one or more fully connected layers 662 (FC1 and FC2). The DCN 650 may further include a logistic regression (LR) layer 664. Between each layer 656, 658, 660, 662, 664 of the DCN 650 are weights (not shown) that are to be updated. The output of each of the layers (e.g., 656, 658, 660, 662, 664) may serve as an input of a succeeding one of the layers (e.g., 656, 658, 660, 662, 664) in the DCN 650 to learn hierarchical feature representations from input data 652 (e.g., images, audio, video, sensor data and/or other input data) supplied at the first of the convolution blocks 654A. The output of the DCN 650 is a classification score 666 for the input data 652. The classification score 666 may be a set of probabilities, where each probability is the probability of the input data, including a feature from a set of features.

Figure 7:
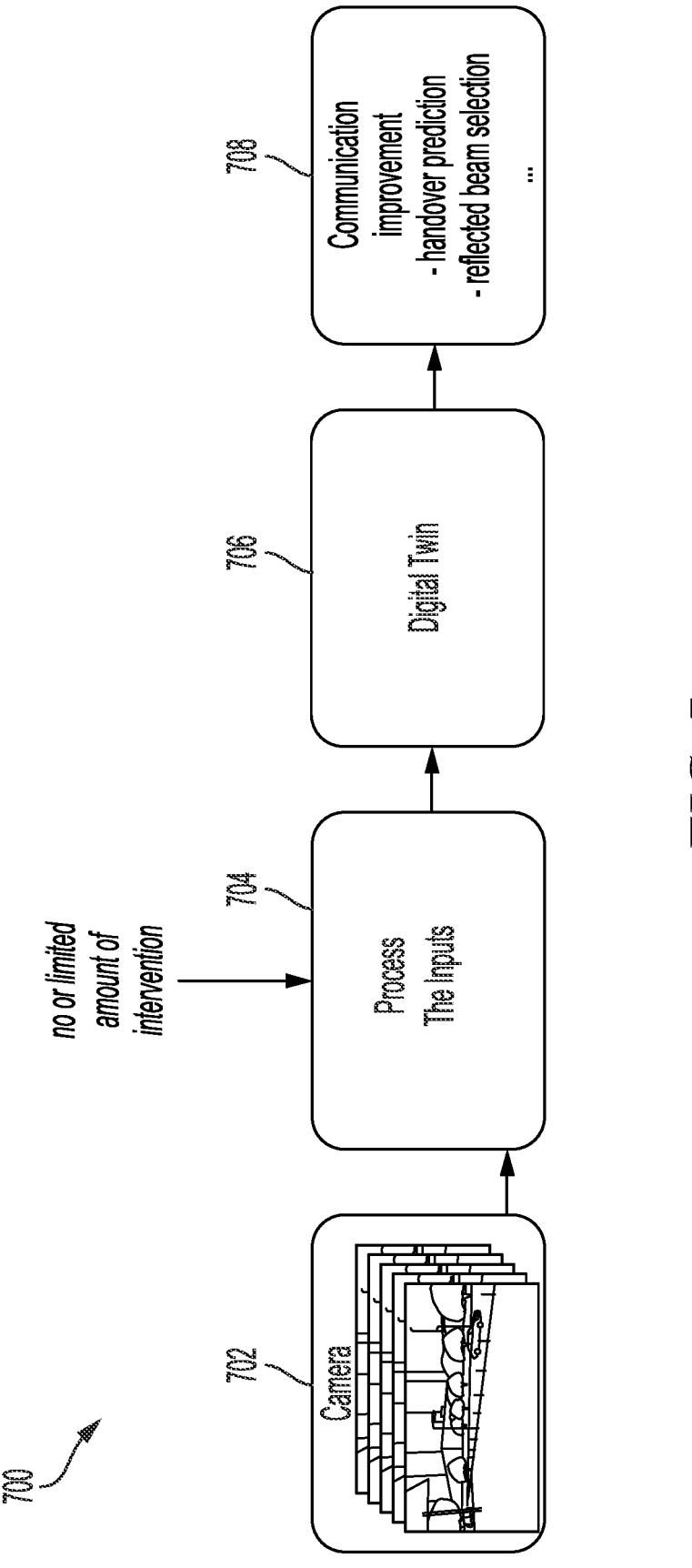
FIG. 7 is a high-level block diagram illustrating an example processing pipeline for wireless communication, in accordance with various aspects of the present disclosure.

FIG. 7 is a high-level block diagram illustrating an example processing pipeline 700 for wireless communication, in accordance with various aspects of the present disclosure. Referring to FIG. 7, the example processing pipeline 700 may receive a set of visual inputs 702 from one or more cameras. The inputs may be processed using one or more processors 704 to generate a digital twin 706 of an environment in which a wireless communication system is being employed.

A digital twin may be considered a logical copy of a communications network (e.g., 5G new radio, 6G, or edge cloud) that may be used by an application to estimate key performance metrics of the communication system to make optimized informed decisions. For instance, optimization use cases may include path selection and application rate encoding, as well as the design of self-managed, autonomous edge-computing systems that can operate without human intervention.

The digital twin 706 may, in turn, aid in determining communication improvements 708. Examples of such communication improvements 708 may include (but are not limited to) beam prediction, handover prediction, blockage detection, and reflected beam selection, for example.

One problem in wireless communication systems may be beam prediction in high frequency communication. High frequency communication may be challenging because such communication involves pointed beams. To increase power to the UE (e.g., 120) while reducing the loss between the network device (e.g., 110) and the UE at high frequency, it may be desirable to pinpoint the location of the UE. However, pinpointing the location of the UE (e.g., 120) may be difficult because the UE may be moving, and possibly moving at a high speed.

Figure 8:
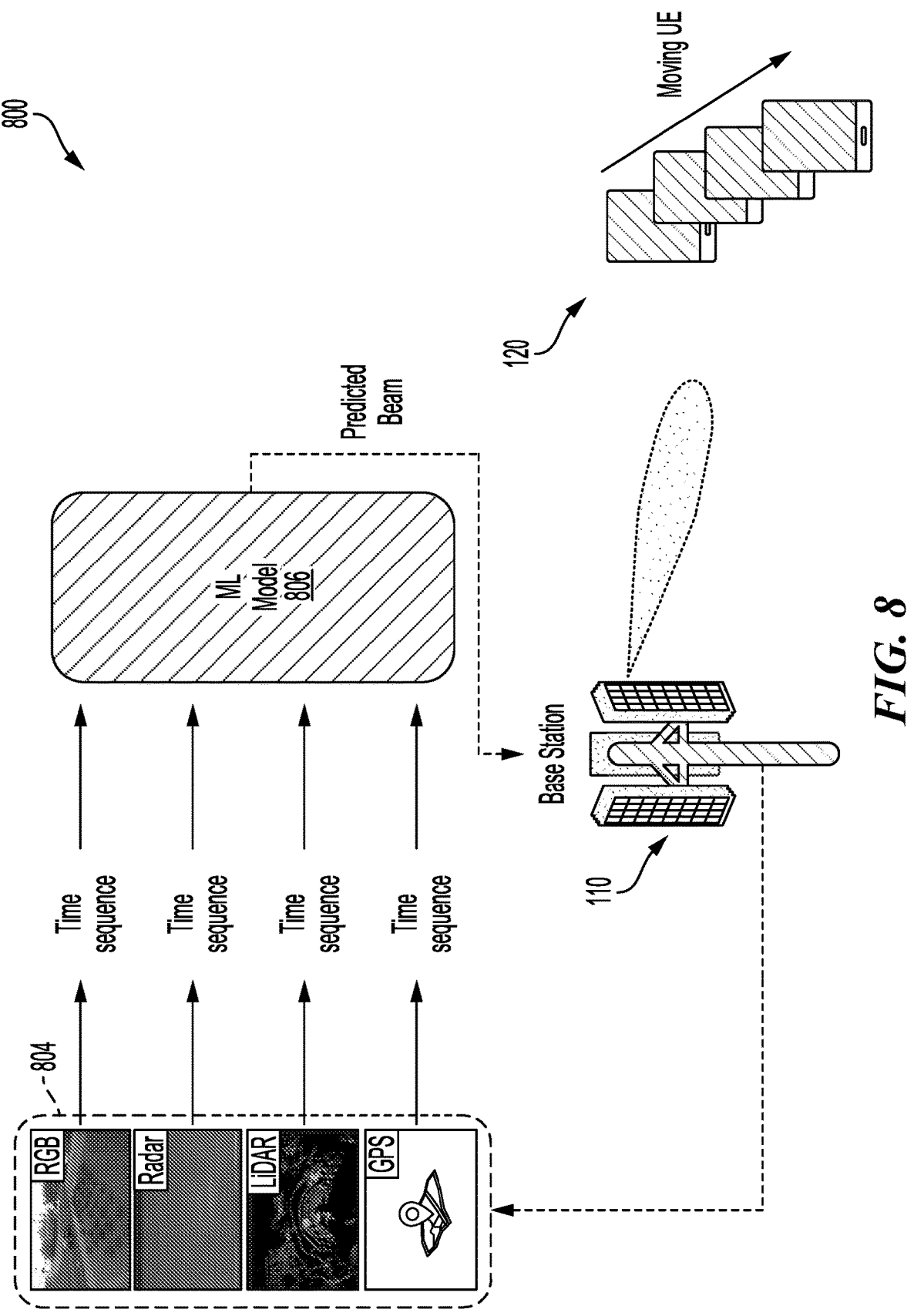
FIG. 8 is a diagram illustrating an example architecture for beam prediction, in accordance with various aspects of the present disclosure.

FIG. 8 is a diagram illustrating an example architecture 800 for beam prediction, in accordance with various aspects of the present disclosure. Referring to FIG. 8, a network device such as base station 110 may be configured for a multisensory communication and high-fidelity hologram 804 (may be referred to as multisensory communication unit). The multisensory communication unit 804 may include one or more cameras, LiDAR sensors, IMU sensors, and global positioning satellite (GPS) sensors. Data received via the multisensory communication unit 804 may be aggregated and supplied to an ML model 806. Each of the data modalities may have different characteristics. Respective time data sequences corresponding to the different data modalities may be provide to the ML model 806. The ML model 806 may process the aggregated data and determine a beam prediction exploiting the aggregated data. The beam prediction may be used to beam steer to a UE 120, which may be moving. Beam steering involves changing the phase of input signals on radiating antenna elements of the base station 110 to steer a signal beam (e.g., millimeter wave frequency signal) in the direction of the UE 120.

In some aspects, the base station 110 may be initialized. A location of the UE 120 may be determined and the beam may be generated to initiate communication with the UE 120. The movement and location of the UE 120 may be tracked and used to update the beam to enable communication. In some aspects, the beam update may be conducted concurrently with the location tracking.

Conventional approaches for beamforming may be time consuming and may result in significant expended energy and spectrum resources. The conventional approaches for beamforming between the base station 110 and the UE 120 may take the ellipses at the base station 110 and sweep through all of possible ellipses defined for the UE 120 and then search for the beam pair that reduces the signal loss (e.g., having the beam peak direction). In contrast, the architecture 800 may beneficially determine the beam aided by the multisensory data (e.g., via a camera, LiDAR sensor, an IMU sensor, or a GPS sensor) to predict a signal beam that may reduce energy and resource consumption, as well as latency.

Figure 9:
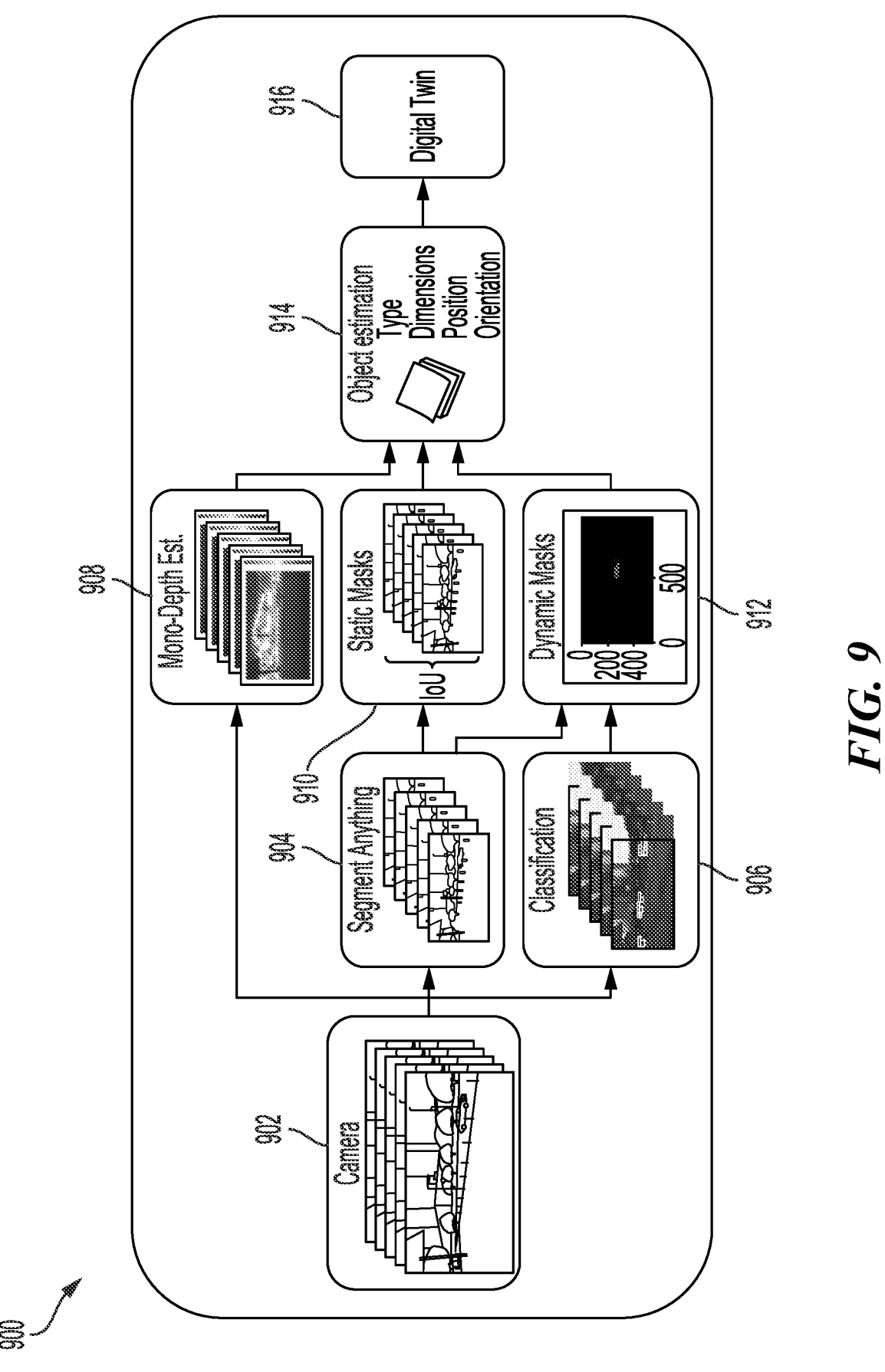
FIG. 9 is a block diagram illustrating an example pipeline for multi-modal beam prediction, in accordance with various aspects of the present disclosure.

FIG. 9 is a block diagram illustrating an example pipeline 900 for multi-modal beam prediction, in accordance with various aspects of the present disclosure. Referring to FIG. 9, the example pipeline 900 may receive an input 902 from one or more cameras, for example. The input 902 may comprise a two-dimensional (2D) image. However, the present disclosure is not so limited, and the input 902 may be provided from a sensor such as LiDAR, radar, IMU, and/or other sensors, for example. The input 902 may be folded and provided to three paths of the example pipeline 900. In a first path, objects included in a scene of the input 902 may be classified by a classification module 906. In some aspects, the classification module 906 may perform object detection tasks such as (but not limited to) you only look once (yolo) object detection tasks, to detect objects in the scene of the input 902.

In a second path of the example pipeline 900, a mask may be generated. The input 902 may be provided to a segmentation module 904 (e.g., a segment anything model (SAM)). The segmentation module 904 may perform a segment anything process on the input 902, for example, to generate a static mask. The segmentation module 904 may provide image segmentation for generating a static mask for each object in the scene, of the input 902. The static mask may provide information of the input 902 such as the width, height, and position. The static mask may be used to distinguish objects in the scene of the input 902.

A tracking module 910 may take the static mask and perform an intersect over union (IoU) operation. IoU is an evaluation metric for tasks such as segmentation, object detection, and tracking. IoU may evaluate the proximity between a predicted bounding box and a ground truth bounding box for the objects in the scene. Static masks may refer to masks which do not change shape or position over longer periods of time (e.g., more than one hour). Static masks may be determined according to a predefined threshold (e.g., 0.85) such that a mask may be considered static if the mask has an IoU that is greater than or equal to the predefined threshold over a predefined period of time (e.g., fifteen minutes, thirty minutes, one hour, or any other time period). On the other hand, if the shape of the mask and/or the position changes, then the mask may be considered a dynamic mask 912. In some aspects, the dynamic mask 912 may have a width and height that are similar over time. Thus, for dynamic mask 912 may be used for tracking objects that are in motion in the environment. In some examples, an object may be tracked in the environment using the position information for dynamic mask 912 over a sequence of images (e.g., input 902), for instance.

In a third path, the input 902 may be provided to a depth estimation module 908. The depth estimation module 908 may perform a mono-depth estimation process on the images of the input 902. A mono-depth estimation may take a single image of the input 902 and estimate the depth of each pixel in the image.

The mono-depth estimate (e.g., generated by the depth estimation module 908) may be combined with the static mask (e.g., generated by the segmentation module 904) and the dynamic mask 912 in an object estimation module 914. The object estimation module 914 may filter per object detected in the scene of the input 902, a distance of the detected object from the camera based on the mono-depth estimate. The object estimation module 914 may use the properties of the camera to determine the angle information (e.g., angle of arrival) for the detected objects. For example, in various aspects, the object estimation module 914 may determine angle information from vision (e.g., using the camera) by computing a pinhole transformation. A pinhole transformation is a model that describes the mathematical relationship between the coordinates of a point in three-dimensional (3D) space and its projection onto the image plane (e.g., input 902) of a pinhole camera, in which the camera aperture may be describes as a point and no lenses are used to focus light. The pinhole transformation may be given by:

$$\alpha_{Vision} = g\left( \frac{1}{N_{pixel}} \sum_{i=0}^{N_{pixel}} S(y(i)) \right), \tag{1}$$

$$g(y) = \tan^{-1}(y/f_y), \tag{2}$$

where $\alpha_{Vision}$ represents the angle of the camera object, S represents the mask containing the x, y pixel coordinates, where $f_y$ the field of view in the y direction. The pinhole transformation g may enable reliably conversion the angle of the camera object (e.g., a car or person) to a real global positioning satellite (GPS) angle (e.g., middle of object). Ins some aspects, the transformation may be learned using a neural network because the field of view $f_y$ may be unknown or may be split into an x, y transformation as well. If the object is detected in the camera, then the angle information (e.g., $\alpha_{Vision}$ and/or GPS angle) may be used for beam prediction. The object estimation module 914 may also determine the type, dimensions, position, and/or orientation of the detected objects.

In various aspects, the object estimation module 914 may comprise an artificial neural network (e.g., 350). The object estimation module 914 may extract features of the detected objects in the scene of the input 902. Based on the object information determined (e.g., type, dimensions, position, and/or orientation) and the 2D image of the input 902, the object estimation module 914 may generate a 3D model of the detected objects to model an environment observed in the input 902 by the camera. The 3D model of the environment may be considered a digital twin 916.

In various aspects, the digital twin 916 may include a subset of the objects observed in the input 902. Because the example pipeline 900 may be directed to wireless communication as a downstream task, the objects modeled by the object estimation module 914 may be preselected rather than generating a full digital twin 916 (in which all objects may be modeled). Thus, the object estimation module 914 may limit the objects modeled to those that may impact communication parameters (e.g., objects that may potentially block a wireless communication signal). In some aspects, Kalman filtering, tracking and additional processing may also be performed.

The digital twin 916 may in turn be employed for beam management for a wireless communication. The digital twin 916 may process aggregated data from one or more sensors (e.g., 804 or 902) and may determine a beam prediction exploiting the aggregated sensor data (e.g., 804 or 902). The beam prediction may be used to beam steer to a UE 120, which may be stationary or may be moving.

In some aspects, the digital twin 916 may be communicated to one or more UEs (e.g., 120). In such case, the UEs (e.g., 120) may operate the digital twin for beam prediction to beam steer to a network device (e.g., 110). Furthermore, the UEs (e.g., 120) may feedback beam prediction information (e.g., angle information, position information, or set of beams predicted to beam steer to the network device 110) from the UEs (e.g., 120) to the network device (e.g., 110). The feedback may be used by the digital twin 916 operated at the network device (e.g., 110), for instance (but not limitation), to update object detection information, position information, angle information, sensor data developed at the UE (e.g., GPS data, image data, etc.), as well as the beam prediction to beam steer to each of the UEs. As such, in various aspects, the digital twin 916 of the UEs (e.g., 120) and the digital twin 916 of the network device (e.g., 110) may collaboratively manage beams for wireless communication between the UEs (e.g., 120) and the network device (e.g., 110). Accordingly, the digital twin 916 may be employed to predict movement of objects (e.g., tracking) and proactively predict whether a beam should be changed (e.g., angular profile or power) based on the predicted movement. In addition, the digital twin 916 of a receiving device (e.g., 110 or 120) may decide a beam to be measured. In turn, the digital twin 916 of the network device (e.g., 110) and/or the digital twin of UEs (e.g., 120) may decide (independently or collaboratively) whether to change the beam. Furthermore, the digital twin 916 of the network device (e.g., 110) and/or the digital twin of UEs (e.g., 120) may directly decide (independently or collaboratively) when to change the beam.

Figure 10:
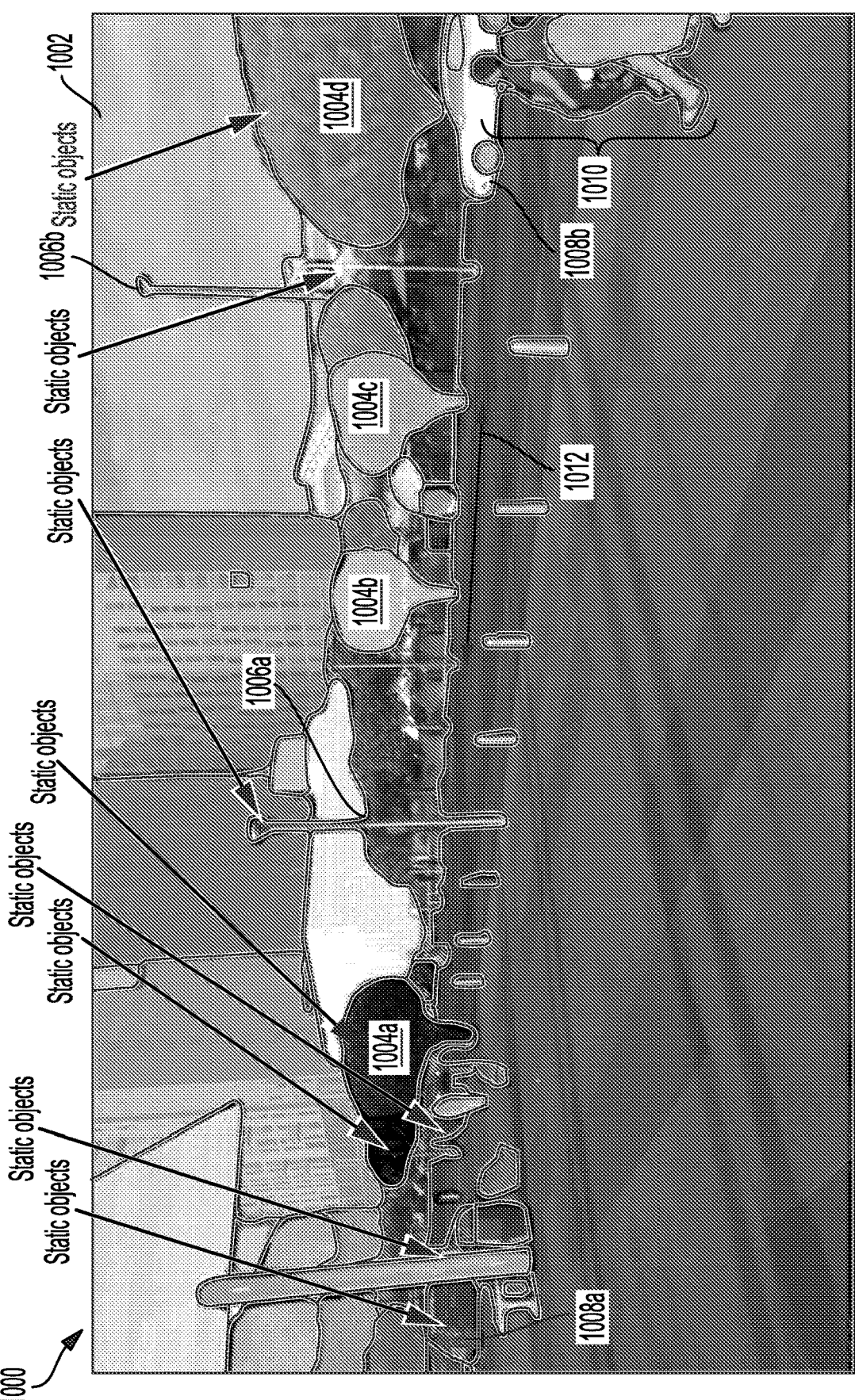
FIG. 10 is a diagram illustrating an example of segmentation of an input image, in accordance with various aspects of the present disclosure.

FIG. 10 is a diagram illustrating an example segmentation 1000 of an input image, in accordance with various aspects of the present disclosure. As shown in FIG. 10, the example segmentation 1000 may include objects detected in the scene of an image 1002. For example, as described with reference to FIG. 9, a segmentation module 904 (e.g., a segment anything model (SAM)) may generate a static mask for each object detected in the image of the input 902. In doing so, a bounding box may be provided for each of the detected objects. For instance, as shown in FIG. 10, the objects detected may include static objects that are fixed in the environment such as trees 1004*a-d*, poles 1006*a-c*, or a parked car 1008*a*. In addition, the objects detected in the example segmentation 1000 may include dynamic objects such as objects that may be moving in the environment. The dynamics objects may, for instance, include cars 1008*b* on a street 1012 or people 1010. However, object detection may be limited to objects that may impact communication parameters. As shown in the example of FIG. 10, the objects detected may include objects that may block signal transmission but may not include objects such as roadway (e.g., no bounding box is shown for the street 1012).

Angle information and a distance to the camera generating the image 1002 may be determined for each detected object (e.g., trees 1004*a-d*). In various aspects, the objects detected may be classified, for example using the classification module 903 of FIG. 9. The objects may be split according to classification and tracking may be performed based on the classification. For instance, if an object is classified as a tree or other object that may be fixed in the environment, tracking may not be performed. On the other hand, for objects that may be dynamic such as the car 1008*b*, tracking may be performed.

Figure 11:
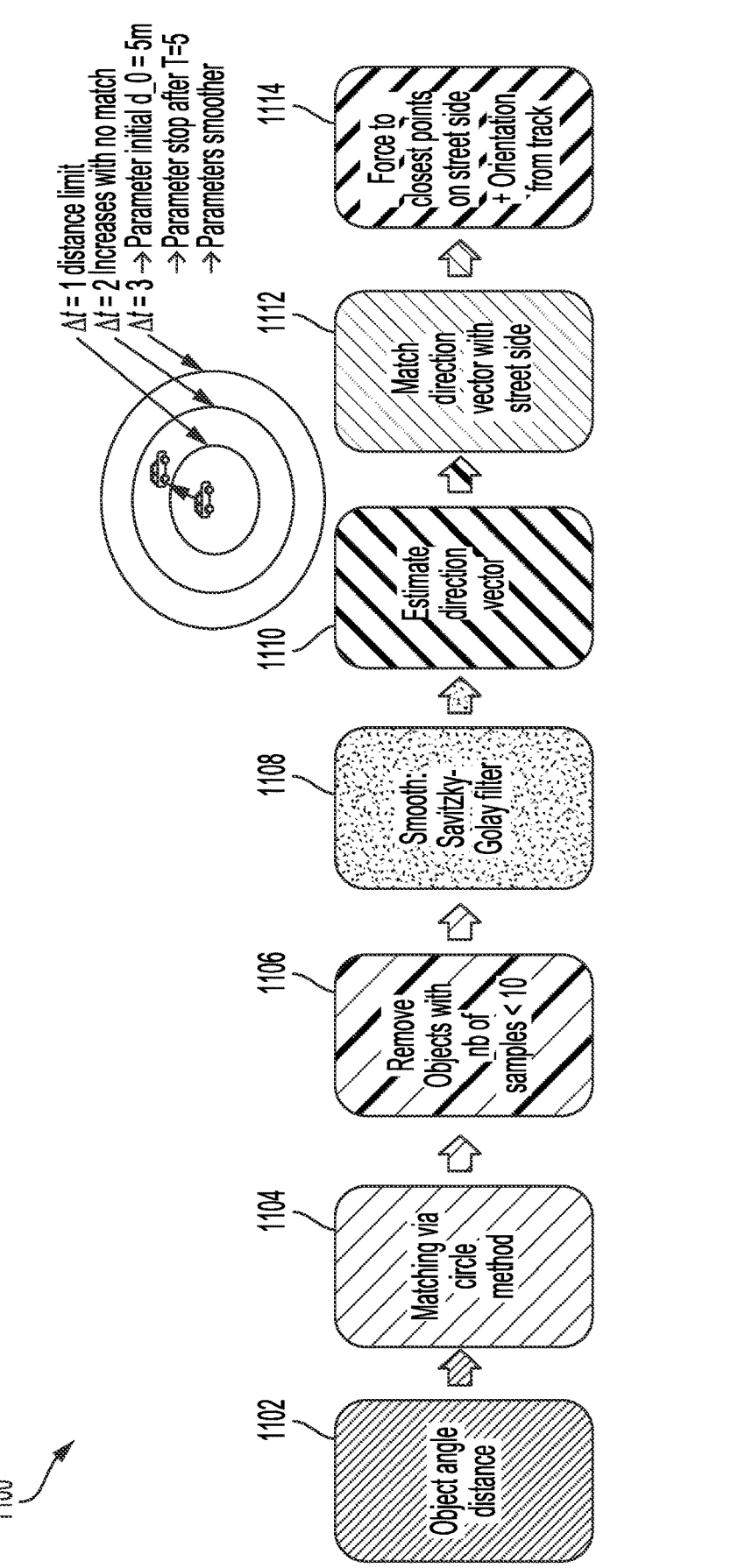
FIG. 11 is a block diagram illustrating an example process for object tracking and matching, in accordance with various aspects of the present disclosure.

FIG. 11 is a block diagram illustrating an example process 1100 for object tracking and matching, in accordance with various aspects of the present disclosure. Referring to FIG. 11, the example process 1100 may include determining an object angle and distance from a camera at block 1102. For example, as described with reference to FIG. 9, the object estimation module 914 may estimate an object distance and angle information for each of the detected objects in a scene of the input image. The angle may, for example be estimated using a pinhole transformation for example, The distance, may be measured using the mono-depth estimate (e.g., generated by 908).

At block 1104, a circle method may be applied to implement matching. Each of the detected objects may be matched to paths over consecutive time steps in 3D. In some examples, a list of objects detected may be generated at time instance t=0. The list may include candidate objects for which tracking may be performed. Then at time instance t=1, a sweep is performed to detect new objects and identify which one of the new objects detected at t=1 is the closest to the objects detect at t=0. If the new objects lie within a predefined radius (e.g., a radius of 5 m may be used for cars, while a radius of 0.5 m may be used for a person), then such objects may be considered a match and may be assigned to each other. If the new objects lie outside of the predefined radius, then such objects may be considered different objects and such new objects may added to the list of objects.

At block 1106, if an object is not active (e.g., not moving/stationary) for predefined time duration (e.g., N frames), then the object will be deactivated from tracking (removed from the list).

At block 1108, the trajectory for active objects over the previous N samples may be smoothed, for instance, using an exponential smoothing or other smoothing technique. At block 1110, the direction of the object may be estimated from the previous position estimations. From the estimated direction, at block 1112, direction in which the object (e.g., a car) is moving (e.g., the side of the road. Then, at block 1114, the position of each of the objects included in the list of objects. For example, the position of an object may be updated to be with known bounds of a road.

In some aspects, side information may be developed from other sensors (e.g., GPS data) and may be exploited to aid in tracking the objects. That is, side information may be used to filter out objects and/or track objects more precisely. For example, if the object detected is a car (e.g., car 1008*b*), GPS data may be used to force limit the tracking based on characteristics (e.g., orientation, number of lanes, and speed information) of a street (e.g., 1012). Accordingly, at block 1114, objects detected (e.g., car 1008*b*) may be forced to closest points on the street (e.g., 1012). For instance, tracking for a car (e.g., 1008*b*) may be limited to the travel along a street (e.g., 1012) rather than on a sidewalk or waterway.

In some aspects, one or more thresholds may be applied to tracking of detected objects. For instance, a distance limit Δt may be applied for tracking. The distance limit may be applied to determine when communication parameters may be changed.

Figure 12:
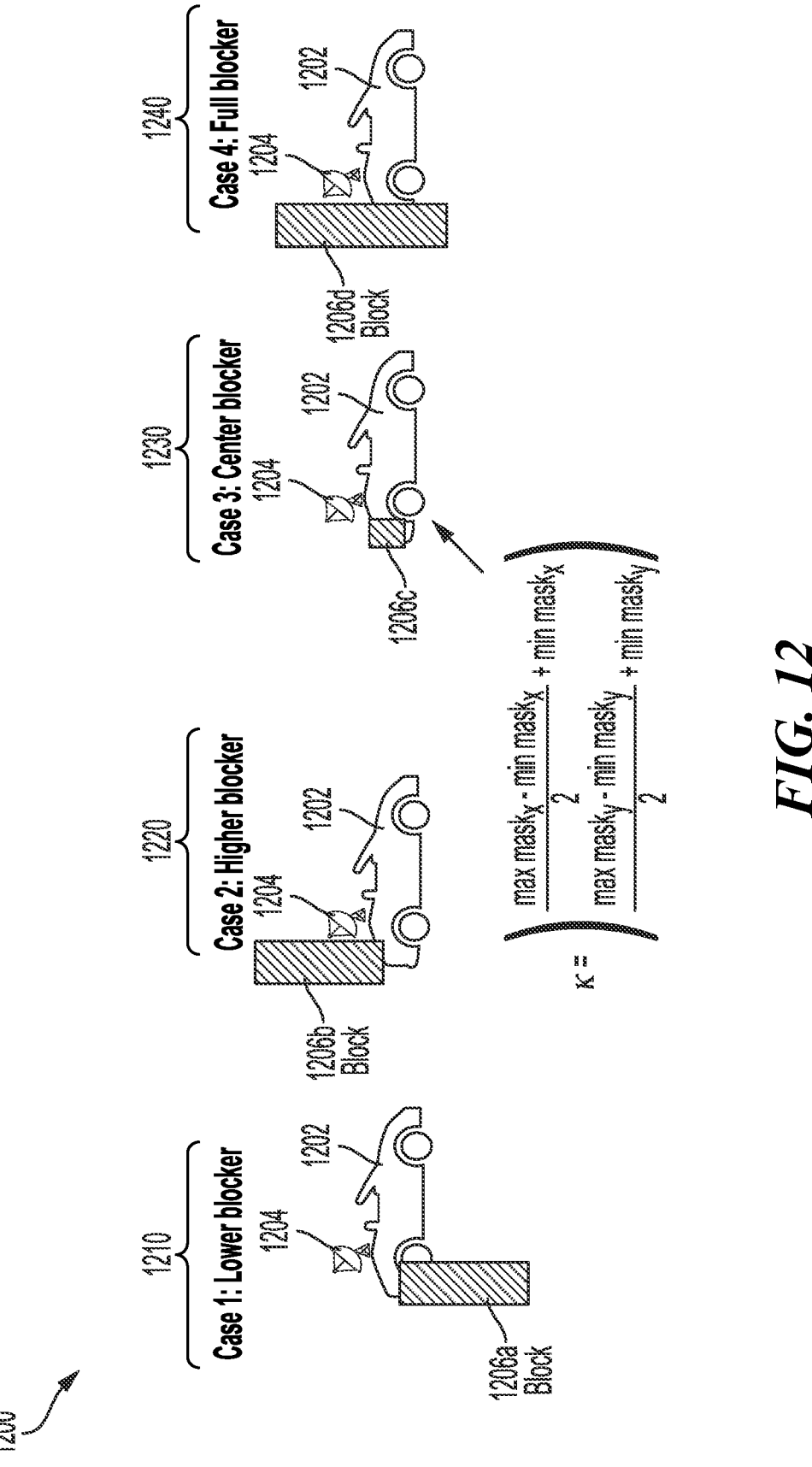
FIG. 12 is a block diagram illustrating an example rule-based decision based on a blockage detection, in accordance with various aspects of the present disclosure.

FIG. 12 is a block diagram 1200 illustrating an example rule-based decision based on a wireless signal link degradation detection, in accordance with various aspects of the present disclosure. In various aspects of the present disclosure, a digital twin (e.g., 916) may be employed for predicting link degradation or signal blockage. In the example of FIG. 12, an antenna 1204 on a rear end of a car 1202 may be detected. When another object (e.g., a person or a tree) is detected between the antenna 1204 on the rear end of the car 1202 and a camera based on an image, a wireless signal between the antenna 1204 and the network may experience link degradation. In addition, based on the distance, angle, direction of travel, velocity, and other information, a prediction of such link degradation and/or blockage may be determined. The prediction may also indicate a location of the predicted link degradation and/or blockage. A rule-based decision making process may be implemented based, for instance, on a type or location of the link degradation or blockage.

As shown in the example of FIG. 12, depending on the location of a source of the link degradation, partial blockage, or complete blockage, a location of a center mask may be updated. The center mask may be used to update the beam prediction for communication with the car 1202. An object detected between or predicted to pass between the camera and the car 1202 may be considered a blocker. In case 1 1210 and case 3 1230, a lower signal degrader 1206*a* and a center signal degrader 1206*c* may respectively be detected or predicted. In case 1 1210 and case 3 1230, the antenna 1204 may not be blocked by a degrader 1206*a*, 1206*c*. As such, the degraders 1206*a*, 1206*c* may be ignored and the location of the center mask for the car 1202 may be retained. On the other hand, in the case of a higher signal degrader such as in case 2 1220 and case 4 1240, because the degraders 1206*b*, 1206*d* may degrade a signal link or may be predicted to degrade a signal link with the antenna 1204, case 2 1220 and case 4 1240 may be treated as signal link degradation cases. Accordingly, the center mask may be updated. For instance, the center mask κ may be computed as follows:

$$\kappa = \left( \frac{\frac{\max\ \mathrm{mask}_x - \min\ \mathrm{mask}_x}{2} + \min\ \mathrm{mask}_x,}{\frac{\max\ \mathrm{mask}_y - \min\ \mathrm{mask}_y}{2} + \min\ \mathrm{mask}_y} \right), \quad (3)$$

where $\max\ \mathrm{mask}_x$ and $\max\ \mathrm{mask}_y$ represent the largest value of x and y, respectively, and $\min\ \mathrm{mask}_x$ and $\min\ \mathrm{mask}_y$ represent the smallest value of x and y, respectively. The center mask κ may provide a list of points (x,y). The center point of the mask may refer to the geometric center of the mask. For example, from the center mask, the smallest value of x and y and the largest value of x and y may be estimated. In turn, such values may be used to estimate the geometric center (e.g., by using a mask having a rectangular shape).

Figure 13:
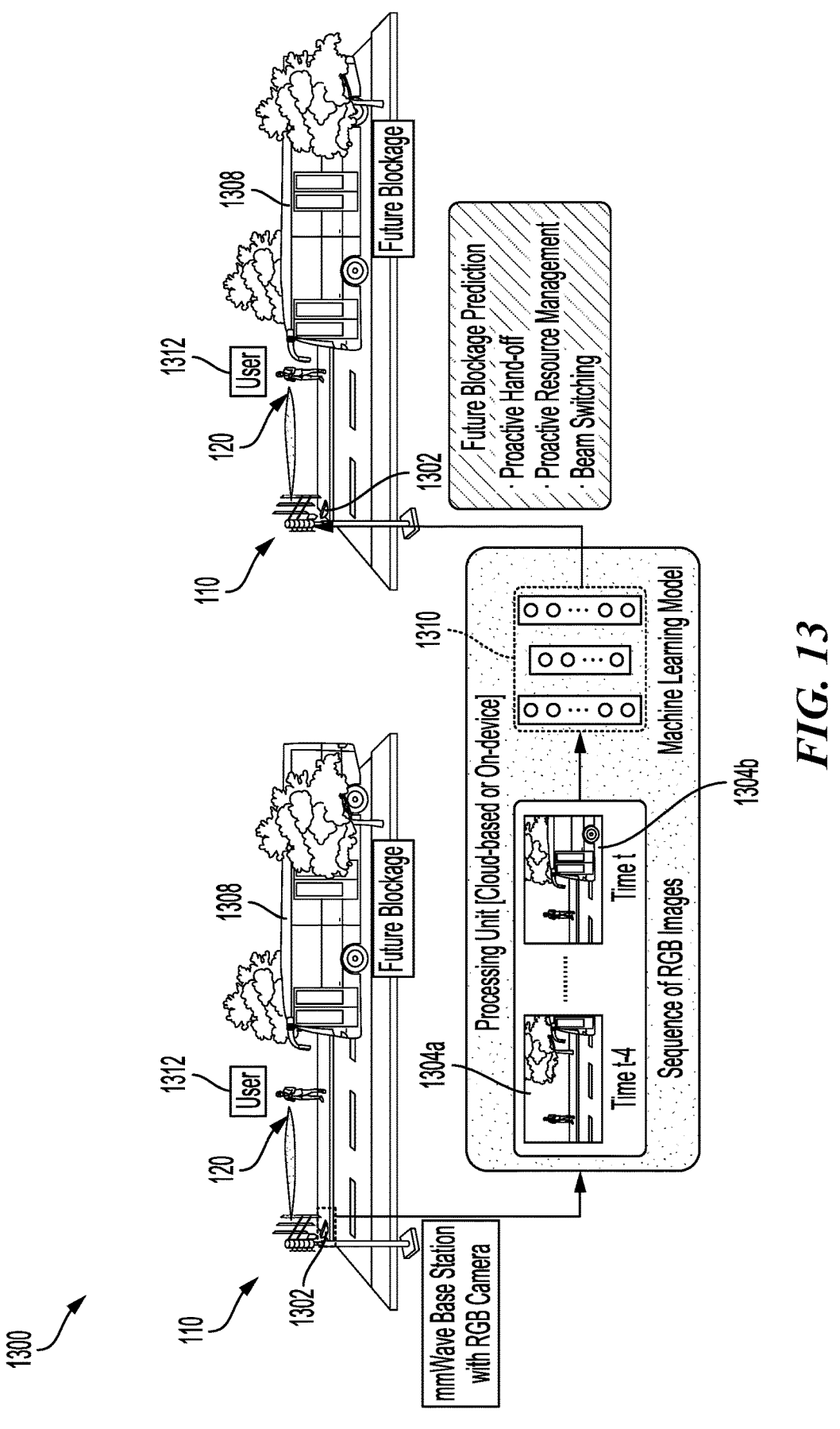
FIG. 13 is a diagram illustrating an example blockage prediction, in accordance with various aspects of the present disclosure.

FIG. 13 is a diagram illustrating an example blockage prediction, in accordance with various aspects of the present disclosure. Referring to FIG. 13, a network device (e.g., a base station 110) may be conducting wireless communication with a user equipment (e.g., 120) of a user 1312 in an environment 1300. The wireless communication may be managed by the network device (e.g., 110) based on a digital twin (e.g., 916) and an input 1304 from a camera 1302 positioned at the network device (e.g., 110). A bus 1308 may be observed in the environment 1300 as indicated by the input 1304 (e.g., 1304*a*, 1304*b*) and may be represented in the digital twin (e.g., 916). Based on an input 1304*a* at time t−1 and an input 1304*b* at time t in conjunction with side information (e.g., GPS data), the location of the bus 1308 may be tracked. Additionally, based on the relative position of the UE (e.g., 120) and the tracking information for the bus 1308, a machine learning model 1310 may predict a future blockage of the wireless communication signal between the network device (e.g., 110) and the UE (e.g., 120). In some aspects, the machine learning model 1310 may be located at the network device (e.g., 110) or a cloud server.

In response, to the predicted blockage (e.g., bus 1308), the network device (e.g., 110) and/or the UE (e.g., 120) may implement beam management actions to support wireless communication between the network device (e.g., 110) and the UE (e.g., 120) using respective digital twins 916. The beam management action may include (but are not limited to) proactive handover to another network device, proactive resource management, or beam switching (e.g., adaptation), for example.

As indicated above, FIGS. 4-13 are provided as examples. Other examples may differ from what is described with respect to FIGS. 4-13.

FIG. 14 is a flow diagram illustrating an example process 1400 for beam management using a digital twin and a stream of inputs from a sensor by a network device, in accordance with various aspects of the present disclosure. With reference to FIGS. 1-13, the example process 1400 may be performed by one or more processors, such as the CPU (e.g., 402), GPU (e.g., 404), DSP (e.g., 406), and/or NPU (e.g., 408), for example.

At block 1402, the one or more processors receive, by the network device, a stream of inputs from one or more sensors. For example, as described with reference to FIG. 8, a network device such as base station 110 may be configured for a multisensory communication and high-fidelity hologram 804 (may be referred to as multisensory communication unit). The multisensory communication unit 804 may include one or more cameras, LiDAR sensors, IMU sensors, and global positioning satellite (GPS) sensors. Data received via the multisensory communication unit 804 may be aggregated and supplied to an ML model 806. Each of the data modalities may have different characteristics. In various aspects, a fusion of inputs of different modalities may also be generated using, for example (but not limitation), an element-wise operation such as summation, multiplication, feature stacking, attention mechanisms, or other fusion techniques.

At block 1404, the one or more processors generate, by the network device, a digital twin modeling an environment of a region observed by the one or more sensors. The digital twin includes one or more objects detected based on the stream of inputs. As described, for instance, with reference to FIG. 9, the object estimation module 914 may extract features of the detected objects in the scene of the input 902. Based on the object information determined (e.g., type, dimensions, position, and/or orientation) and the 2D image of the input 902, the object estimation module 914 may generate a 3D model of the detected objects to model an environment observed in the input 902 by the camera. The 3D model of the environment may be considered a digital twin 916.

At block 1406, the one or more processors manage, by the network device, a wireless communication signal beam for communicating with at least one user equipment (UE) in the region observed by the one or more sensors based at least in part on the digital twin. For example, as described in FIG. 9, the digital twin 916 may in turn be employed for beam management for a wireless communication. The digital twin 916 may process aggregated data from one or more sensors (e.g., 804 or 902) and may determine a beam prediction exploiting the aggregated sensor data (e.g., 804 or 902). The beam prediction may be used to beam steer to a UE 120, which may be stationary or may be moving.

Figure 15:
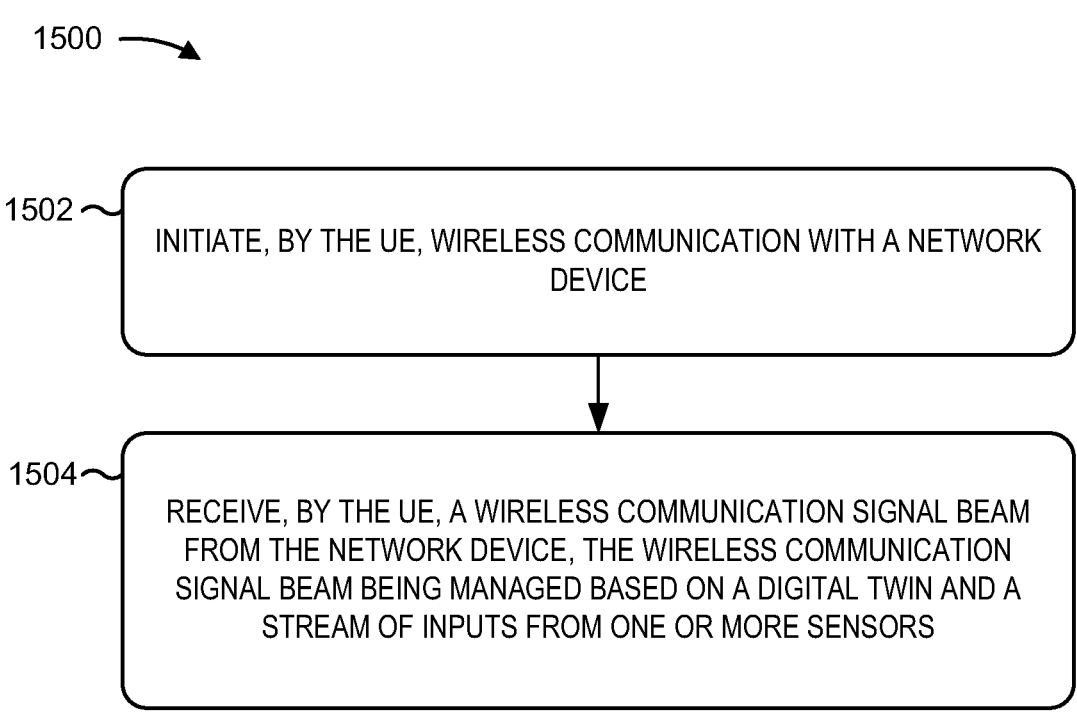
FIG. 15 is a flow diagram illustrating an example process for wireless communication by a user equipment using a beam estimated based on a digital twin and a stream of inputs from a sensor, in accordance with various aspects of the present disclosure.

FIG. 15 is a flow diagram illustrating an example process 1500 for wireless communication by a user equipment using a beam estimated based on a digital twin and a stream of inputs from a sensor, in accordance with various aspects of the present disclosure. With reference to FIGS. 1-13, the example process 1500 may be performed by one or more processors, such as the CPU (e.g., 402), GPU (e.g., 404), DSP (e.g., 406), and/or NPU (e.g., 408), for example.

At block 1502, the one or more processors initiate, by the UE, wireless communication with a network device. The UEs 120 may include a beam management module 140. The beam management module 140 may determine a beam update for wireless communication with a network device. For example, using the beam management module 140, the UE (e.g., 120) may initiate wireless communication with a network device (e.g., 110/130).

At block 1504, the one or more processors receiving, by the UE, a wireless communication signal beam from the network device. The wireless communication signal beam is managed based on a digital twin and a stream of inputs from one or more sensors observing the UE and one or more objects in an environment modeled in the digital twin. For instance, as described in FIG. 9, the digital twin 916 may in turn be employed for beam management for a wireless communication. The digital twin 916 may process aggregated data from one or more sensors (e.g., 804 or 902) and may determine a beam prediction exploiting the aggregated sensor data (e.g., 804 or 902).

Implementation examples are provided in the following numbered clauses.

1. An apparatus comprising:
   at least one memory; and
   at least one processor coupled to the at least one memory, the at least one processor configured to:
      receive, by a network device, a stream of inputs from one or more sensors;
      generate, by the network device, a digital twin modeling an environment of a region observed by the one or more sensors, the digital twin including one or more objects detected based on the stream of inputs; and
      manage, by the network device, a wireless communication signal beam for communicating with at least one user equipment (UE) in the region observed by the one or more sensors based at least in part on the digital twin.

2. The apparatus of clause 1, in which the at least one processor is further configured to generate, by the network device, a predicted beam for conducting wireless communication with the at least one UE using the digital twin based on the stream of inputs from the one or more sensors.

3. The apparatus of clause 1 or 2, in which the at least one processor is further configured to:
   generate, by the network device, a second predicted beam for the at least one UE to conduct uplink communications with the network device; and
   transmit, by the network device, an indication of the second predicted beam to the at least one UE.

4. The apparatus of any of clauses 1-3, in which the one or more sensors includes one or more of a camera, an inertial measurement unit (IMU) sensor, a light detection and ranging (LiDAR) sensor, and a global positioning satellite (GPS) sensor.

5. The apparatus of any of clauses 1-4, in which the network device manages the wireless communication signal beam based on a fusion of information from the stream of inputs.

6. The apparatus of any of clauses 1-5, in which the at least one processor is further configured to:
   track, by the network device, a location of an object of the one or more objects detected based on the stream of inputs, based on an object type;
   update, by the network device, the digital twin based on the tracking; and
   adapt, by the network device, the wireless communication signal beam based on the updated digital twin.

7. The apparatus of any of clauses 1-6, in which the at least one processor is further configured to predict, by the network device, a blocker of a wireless communication signal to a first UE of the at least one UE based on the digital twin and a first location of an object relative to a second location of an antenna of the first UE.

8. The apparatus of any of clauses 1-7, in which one or more of the first UE or the object are moving.

9. The apparatus of any of clauses 1-8, in which the at least one processor is further configured to:
   determine, by the network device, link degradation due to the object based on a degree of overlap of the first location and the second location; and
   adapt, by the network device, wireless communication with the at least one UE based on a link degradation type, the wireless communication being adapted by one of: adapting the wireless communication signal beam, changing a frequency for the wireless communication, or initiating a handover.

10. The apparatus of any of clauses 1-9, in which the at least one processor is further configured to:
    determine a channel state associated with the wireless communication signal beam; and
    supply the channel state as feedback to the digital twin.

11. An apparatus, comprising:
    at least one memory; and
    at least one processor coupled to the at least one memory, the at least one processor configured to:
        initiate, by a user equipment (UE), wireless communication with a network device; and
        receive, by the UE, a wireless communication signal beam from the network device, the wireless communication signal beam being managed based on a digital twin and a stream of inputs from one or more sensors observing the UE and one or more objects in an environment modeled in the digital twin.

12. The apparatus of clause 11, in which the wireless communication signal beam is predicted based on the stream of inputs from the one or more sensors.

13. The apparatus of clause 11 or 12, in which the at least one processor is further configured to:
    receive, from the network device, an indication of a predicted beam for conducting uplink communication with the network device, the predicted beam being determined using the digital twin based on the stream of inputs from the one or more sensors; and
    generate, by the UE, a wireless communication signal based on the predicted beam to communicate with the network device.

14. The apparatus of any of clauses 11-13, in which the one or more sensors includes one or more of a camera, an inertial measurement unit (IMU) sensor, a light detection and ranging (LiDAR) sensor, and a global positioning satellite (GPS) sensor.

15. The apparatus of any of clauses 11-14, in which the wireless communication signal beam is managed based on a fusion of information from the stream of inputs.

16. The apparatus of any of clauses 11-15, in which the wireless communication signal beam is selected from a set of multiple candidate beams determined by the digital twin.

17. A processor-implemented method, implemented by a network device, the processor-implemented method comprising:
    receiving, by the network device, a stream of inputs from one or more sensors;
    generating, by the network device, a digital twin modeling an environment of a region observed by the one or more sensors, the digital twin including one or more objects detected based on the stream of inputs; and
    managing, by the network device, a wireless communication signal beam for communicating with at least one user equipment (UE) in the region observed by the one or more sensors based at least in part on the digital twin.

18. The processor-implemented method of clause 17, further comprising:
    generating, by the network device, a predicted beam for conducting wireless communication with the at least one UE using the digital twin based on the stream of inputs from the one or more sensors.

19. The processor-implemented method of clause 17 or 18, further comprising:
    generating, by the network device, a second predicted beam for the at least one UE to conduct uplink communications with the network device; and
    transmitting, by the network device, an indication of the second predicted beam to the at least one UE.

20. The processor-implemented method of any of clauses 17-19, in which the network device manages the wireless communication signal beam based on a fusion of information from the stream of inputs.

21. The processor-implemented method of any of clauses 17-20, further comprising:
    tracking, by the network device, a location of an object of the one or more objects detected based on the stream of inputs, based on an object type;
    updating, by the network device, the digital twin based on the tracking; and
    adapting, by the network device, the wireless communication signal beam based on the updated digital twin.

22. The processor-implemented method of any of clauses 17-21, further comprising predicting, by the network device, a blocker of a wireless communication signal to a first UE of the at least one UE based on the digital twin and a first location of an object relative to a second location of an antenna of the first UE.

23. The processor-implemented method of any of clauses 17-22, in which one or more of the first UE or the object are moving.

24. The processor-implemented method of any of clauses 17-23, further comprising:
    determining, by the network device, link degradation due to the object based on a degree of overlap of the first location and the second location; and
    adapting, by the network device, wireless communication with the at least one UE based on a link degradation type, the wireless communication being adapted by one of adapting the wireless communication signal beam, changing a frequency for the wireless communication, or initiating a handover.

25. The processor-implemented method of any of clauses 17-24, further comprising:

determining a channel state associated with the wireless communication signal beam; and supplying the channel state as feedback to the digital twin.

26. A processor-implemented method, implemented by a user equipment (UE), the processor-implemented method comprising:

initiating, by a user equipment (UE), wireless communication with a network device; and receiving, by the UE, a wireless communication signal beam from the network device, the wireless communication signal beam being managed based on a digital twin and a stream of inputs from one or more sensors observing the UE and one or more objects in an environment modeled in the digital twin.

27. The processor-implemented method of clause 26, in which the wireless communication signal beam is predicted based on the stream of inputs from the one or more sensors.

28. The processor-implemented method of clause 26 or 27, further comprising:

receiving, from the network device, an indication of a predicted beam for conducting uplink communication with the network device, the predicted beam being determined using the digital twin based on the stream of inputs from the one or more sensors; and generating, by the UE, a wireless communication signal based on the predicted beam to communicate with the network device.

29. The processor-implemented method of any of clauses 26-28, in which the wireless communication signal beam is managed based on a fusion of information from the stream of inputs.

30. The processor-implemented method of any of clauses 26-29, in which the wireless communication signal beam is selected from a set of multiple candidate beams determined by the digital twin.

The foregoing disclosure provides illustration and description but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. An apparatus comprising:

at least one memory; and at least one processor coupled to the at least one memory, the at least one processor configured to:

receive, by a network device, a stream of inputs from one or more sensors;

generate, by the network device, a digital twin modeling an environment of a region observed by the one or more sensors, the digital twin including one or more objects detected based on the stream of inputs;

manage, by the network device, a wireless communication signal beam for communicating with at least one user equipment (UE) in the region observed by the one or more sensors based at least in part on the digital twin;

generate, by the network device, a second predicted beam for the at least one UE to conduct uplink communications with the network device; and transmit, by the network device, an indication of the second predicted beam to the at least one UE.

2. The apparatus of claim 1, in which the at least one processor is further configured to generate, by the network device, a predicted beam for conducting wireless communication with the at least one UE using the digital twin based on the stream of inputs from the one or more sensors.

3. The apparatus of claim 1, in which the one or more sensors includes one or more of a camera, an inertial measurement unit (IMU) sensor, a light detection and ranging (LiDAR) sensor, and a global positioning satellite (GPS) sensor.

4. The apparatus of claim 1, in which the network device manages the wireless communication signal beam based on a fusion of information from the stream of inputs.

5. The apparatus of claim 1, in which the at least one processor is further configured to:

track, by the network device, a location of an object of the one or more objects detected based on the stream of inputs, based on an object type;

update, by the network device, the digital twin based on the tracking; and adapt, by the network device, the wireless communication signal beam based on the updated digital twin.

6. The apparatus of claim 1, in which the at least one processor is further configured to predict, by the network device, a blocker of a wireless communication signal to a first UE of the at least one UE based on the digital twin and a first location of an object relative to a second location of an antenna of the first UE.

7. The apparatus of claim 6, in which one or more of the first UE or the object are moving.

8. The apparatus of claim 6, in which the at least one processor is further configured to:

determine, by the network device, link degradation due to the object based on a degree of overlap of the first location and the second location; and adapt, by the network device, wireless communication with the at least one UE based on a link degradation type, the wireless communication being adapted by one of: adapting the wireless communication signal beam, changing a frequency for the wireless communication, or initiating a handover.

9. The apparatus of claim 1, in which the at least one processor is further configured to:

determine a channel state associated with the wireless communication signal beam; and supply the channel state as feedback to the digital twin.

10. A processor-implemented method, implemented by a network device, the processor-implemented method comprising:

receiving, by the network device, a stream of inputs from one or more sensors;

generating, by the network device, a digital twin modeling an environment of a region observed by the one or more sensors, the digital twin including one or more objects detected based on the stream of inputs;

managing, by the network device, a wireless communication signal beam for communicating with at least one user equipment (UE) in the region observed by the one or more sensors based at least in part on the digital twin;

generating, by the network device, a second predicted beam for the at least one UE to conduct uplink communications with the network device; and transmitting, by the network device, an indication of the second predicted beam to the at least one UE.

11. The processor-implemented method of claim 10, further comprising:

generating, by the network device, a predicted beam for conducting wireless communication with the at least one UE using the digital twin based on the stream of inputs from the one or more sensors.

12. The processor-implemented method of claim 10, in which the network device manages the wireless communication signal beam based on a fusion of information from the stream of inputs.

13. The processor-implemented method of claim 10, further comprising:

tracking, by the network device, a location of an object of the one or more objects detected based on the stream of inputs, based on an object type;

updating, by the network device, the digital twin based on the tracking; and adapting, by the network device, the wireless communication signal beam based on the updated digital twin.

14. The processor-implemented method of claim 10, further comprising predicting, by the network device, a blocker of a wireless communication signal to a first UE of the at least one UE based on the digital twin and a first location of an object relative to a second location of an antenna of the first UE.

15. The processor-implemented method of claim 14, in which one or more of the first UE or the object are moving.

16. The processor-implemented method of claim 14, further comprising:

determining, by the network device, link degradation due to the object based on a degree of overlap of the first location and the second location; and adapting, by the network device, wireless communication with the at least one UE based on a link degradation type, the wireless communication being adapted by one of adapting the wireless communication signal beam, changing a frequency for the wireless communication, or initiating a handover.

17. The processor-implemented method of claim 10, further comprising:

determining a channel state associated with the wireless communication signal beam; and supplying the channel state as feedback to the digital twin.

* * * * *